… … …

United States Patent [19]

Penetrante et al.

[11] Patent Number: 6,038,854
[45] Date of Patent: Mar. 21, 2000

[54] PLASMA REGENERATED PARTICULATE TRAP AND $NO_x$ REDUCTION SYSTEM

[75] Inventors: Bernardino M. Penetrante, San Ramon; George E. Vogtlin, Fremont; Bernard T. Merritt; Raymond M. Brusasco, both of Livermore, all of Calif.

[73] Assignee: The Regents of the University of California, Oakland, Calif.

[21] Appl. No.: 09/120,903

[22] Filed: Jul. 22, 1998

Related U.S. Application Data

[60] Continuation-in-part of application No. 08/906,687, Aug. 5, 1997, which is a division of application No. 08/699,381, Aug. 19, 1996, Pat. No. 5,711,147.

[51] Int. Cl.[7] ........................................ F01N 3/00
[52] U.S. Cl. ........................ 60/297; 60/274; 60/275; 60/303; 60/295; 422/186.03; 423/213.7
[58] Field of Search ............................ 60/274, 275, 301, 60/303, 311, 295, 297; 422/169, 174, 182, 186.03, 186.04, 186.1, 186.16; 423/213.7

[56] References Cited

U.S. PATENT DOCUMENTS

| 4,076,606 | 2/1978 | Suzuki et al. | 204/157.1 |
| 4,954,320 | 9/1990 | Birmingham et al. | |

(List continued on next page.)

OTHER PUBLICATIONS

Hajo Suhr et al, "Reduction of Nitric Oxide in Flue Gases by Point to Plane Corona Discharge with Catalytical Coatings on the Plane Electrode," Combust. Sci. and Tech., vol. 72,pp 101–115, (1990).
B. M. Penetrante, "Plasma Chemistry and Power Consumption in Non–Thermal $DeNO_x$" Non–Thermal Plasma Techniques for Pollution Control Part A—Overview, Fundamentals and Supporting Technologies, pp. 65–89 (1993).

B. M. Penetrante et al, "Nox Reduction by Compact Electron Beam Processing," Proceedings of the 1995 Diesel Engine Emissions Reduction Workshop, pp. IV–75 to IV–85, Jul. 24–27, 1995.

T. M. Yonushonis et al, "Microwave Regenerated Particulate Trap," Proceedings of the 1995 Diesel Emissions Reduction Workshop, pp. V–17 to V–23, Jul. 24–27, 1995.

J. W. Patten, Cummins Engine Company, Inc., "Doesel Engine Emissions Reduction History and Future Prospects," pp. 201–205 Proceedings of the 1997 Diesel Engine Emissions Reduction Workshop (Available from the U.S. Department of Commerce, Technology Administration, National Technical Information Service, Springfield, VA 22161).

*Primary Examiner*—Thomas Denion
*Assistant Examiner*—Binh Tran
*Attorney, Agent, or Firm*—Alan H. Thompson

[57] ABSTRACT

A non-catalytic two-stage process for removal of $NO_x$ and particulates from engine exhaust comprises a first stage that plasma converts NO to $NO_2$ in the presence of $O_2$ and hydrocarbons, and a second stage, which preferably occurs simultaneously with the first stage, that converts $NO_2$ and carbon soot particles to respective environmentally benign gases that include $N_2$ and $CO_2$. By preconverting NO to $NO_2$ in the first stage, the efficiency of the second stage for $NO_x$ reduction is enhanced while carbon soot from trapped particulates is simultaneously converted to $CO_2$ when reacting with the $NO_2$ (that converts to $N_2$). For example, an internal combustion engine exhaust is connected by a pipe to a chamber where carbon-containing particulates are electrostatically trapped or filtered and a non-thermal plasma converts NO to $NO_2$ in the presence of $O_2$ and hydrocarbons. Volatile hydrocarbons ($C_xH_y$) from the trapped particulates are oxidized in the plasma and the remaining soot from the particulates reacts with the $NO_2$ to convert $NO_2$ to $N_2$, and the soot to $CO_2$. The nitrogen exhaust components remain in the gas phase throughout the process, with no accompanying adsorption.

29 Claims, 7 Drawing Sheets

U.S. PATENT DOCUMENTS

| | | |
|---|---|---|
| 5,022,226 | 6/1991 | Bell . |
| 5,208,205 | 5/1993 | Subramanian et al. . |
| 5,236,672 | 8/1993 | Nunez et al. . |
| 5,336,476 | 8/1994 | Kintaichi et al. . |
| 5,424,044 | 6/1995 | Kalka . |
| 5,440,876 | 8/1995 | Bayliss et al. . |
| 5,474,747 | 12/1995 | Hayashi et al. . |
| 5,492,678 | 2/1996 | Ota et al. . |
| 5,500,194 | 3/1996 | Bell . |
| 5,534,237 | 7/1996 | Yoshida et al. . |
| 5,698,012 | 12/1997 | Yoshikawa ................................. 96/47 |
| 5,711,147 | 1/1998 | Vogtlin et al. . |
| 5,715,677 | 2/1998 | Wallman et al. . |
| 5,746,984 | 5/1998 | Hoard . |
| 5,891,409 | 4/1999 | Hsiao et al. ........................ 423/239.1 |

PLASMA REGENERATED PARTICULATE TRAP AND $NO_x$ REDUCTION SYSTEM

COPENDING APPLICATION

This Application is a continuation-in-part of U.S. patent application Ser. No. 08/906,687, filed Aug. 5, 1997, which is a divisional application of U.S. patent application Ser. No. 08/699,381, filed Aug. 19, 1996, now U.S. Pat. No. 5,711,147 and titled, PLASMA ASSISTED CATALYTIC REDUCTION SYSTEM. Such applications are incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the noncatalytic reduction of $NO_x$ and particulates in engine exhaust, and more particularly to systems for decomposing $NO_x$ to $N_2$ and $O_2$ and particulates to $CO_2$ in oxygen-rich environments.

2. Description of Related Art

The control of $NO_x$ emissions from vehicles is a world-wide environmental problem. Gasoline engine vehicles can use newly developed three-way catalysts to control such emissions, because their exhaust gases lack oxygen. But so-called "lean-burn" gas engines, and diesel engines too, have so much oxygen in their exhausts that conventional catalytic systems are effectively disabled. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn engine exhausts can inhibit $NO_x$ removal in conventional three-way catalytic converters. An effective and durable catalyst for controlling $NO_x$ emissions under net oxidizing conditions is also critical for diesel engines.

Catalysts that have the activity, durability, and temperature window required to effectively remove $NO_x$ from the exhaust of lean-burn engines are unknown. Prior art lean-$NO_x$ catalysts are hydrothermally unstable. A noticeable loss of activity occurs after relatively little use, and even such catalysts only operate over very limited temperature ranges. Conventional catalysts are therefore inadequate for lean-burn operation and ordinary driving conditions.

Catalysts that can effectively decompose $NO_x$ to $N_2$ and $O_2$ in oxygen-rich environments have not yet been developed, although it is a subject of considerable research. But see, U.S. Pat. No. 5,208,205, issued May 4, 1993, to Subramanian, et al. An alternative is to use catalysts that selectively reduce $NO_x$ in the presence of a co-reductant, e.g., selective catalytic reduction (SCR) using ammonia as a co-reductant.

Using co-existing hydrocarbons in the exhaust of mobile lean-burn gasoline engines as a co-reductant is a more practical, cost-effective, and environmentally sound approach. The search for effective and durable SCR catalysts that work with hydrocarbon co-reductants in oxygen-rich environments is a high-priority issue in emissions control and the subject of intense investigations by automobile and catalyst companies, and universities, throughout the world.

SCR catalysts that selectively promote the reduction of $NO_x$ under oxygen-rich conditions in the presence of hydrocarbons are known as lean-$NO_x$ catalysts. More than fifty such SCR catalysts are conventionally known to exist. These include a wide assortment of catalysts, reductants, and conditions. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to water vapor and high temperatures. As an example, the Cu-zeolite catalysts deactivate irreversibly if a certain temperature is exceeded. The deactivation is accelerated by the presence of water vapor in the stream. In addition, water vapor suppresses the NO reduction activity even at lower temperatures.

The problems encountered in lean-$NO_x$ catalysts include lessened activity of the catalyst in the presence of excessive amounts of oxygen, reduced durability of the catalyst in the presence of water, sulfur, and high temperature exposure, and narrow temperature windows in which the catalyst is active. Practical lean-$NO_x$ catalysts must overcome all three problems simultaneously before they can be considered for commercial use.

Lean-burn engine exhausts have an excessive amount of oxygen that renders conventional three-way catalytic converters useless for $NO_x$ removal. The excess oxygen adsorbs preferentially on the precious metal, e.g., Pt, Rh, and Pd, surfaces in the catalyst, and inhibits a chemical reduction of $NO_x$ to $N_2$ and $O_2$. A wide variety of catalysts and reductants are known to promote lean-$NO_x$ catalysis, however, all such catalysts have proven to be susceptible to chemical and/or thermal deactivation. Another major hurdle for commercialization of the current lean-$NO_x$ catalysts is the lack of durability in catalysts to the effects of high-temperature water vapor, which is always present in engine exhaust. Conventional lean-$NO_x$ catalysts are hydrothermally unstable and lose activity after only a short operation time.

Some gasoline can contain up to 1200 ppm of organo-sulfur compounds. These convert to $SO_2$ and $SO_3$ during combustion. Such $SO_2$ will adsorb onto the precious metal sites at temperatures below 300° C. and thereby inhibits the catalytic conversions of CO, $C_xH_y$ (hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the only solution to this problem offered has been to use fuels with low sulfur contents.

Another major source of catalyst deactivation is high temperature exposure. This is especially true in automobile catalysts where temperatures close to 1000° C. can exist. The high-temperatures attack both the catalyst precious metal and the catalyst carrier, e.g., gamma alumina ($\gamma$-$Al_2O_3$). Three-way catalysts are comprised of about 0.1 to 0.15 percent precious metals on a $\gamma$-$Al_2O_3$ wash coat, and use $La_2O_3$ and/or BaO for a thermally-stable, high surface area $\gamma$-$Al_2O_3$. Even though the precious metals in prior art catalysts were initially well dispersed on the $\gamma$-$Al_2O_3$ carrier, they were subject to significant sintering when exposed to high temperatures. This problem, in turn, led to the incorporation of certain rare earth oxides such as $CeO_2$ to minimize the sintering rates of such precious metals.

Because of the remarkable success that has been achieved in the use of modifiers for improving the durability of the modern catalytic converters, this same approach is being used in the attempt to improve the durability of lean-$NO_x$ catalysts. Much effort has therefore been devoted to the use of modifiers to improve the stability of lean-$NO_x$ catalysts in the simultaneous presence of water, $SO_2$, and high temperature exposure. However, the results are still far from being satisfactory.

Another catalyst technology for $NO_x$ removal involves "lean $NO_x$ trap" catalysis. As with SCR lean-$NO_x$ catalysts, the lean-$NO_x$ trap technology can involve the catalytic oxidation of NO to $NO_2$ by catalytic metal components effective for such oxidation, such as precious metals; however, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under stoiciometrically fuel-rich combustion conditions that effect a reduction of the released $NO_x$ to $N_2$.

Both lean-$NO_x$ SCR and lean-$NO_x$-trap catalysts, i.e., $NO_x$ reduction catalysts, have been limited to use for low sulfur fuels because catalysts that are active for converting NO to $NO_2$ are also active in converting $SO_2$ to $SO_3$. Both lean $NO_x$ SCR and trap catalysts have shown serious deactivation in the presence of $SO_x$ because, under oxygen-rich conditions, $SO_x$ adsorbs more strongly on $NO_2$ adsorption sites than $NO_2$, and the adsorbed $SO_x$ does not desorb altogether even under fuel-rich conditions. Such presence of $SO_3$ leads to the formation of sulfuric acid and sulfates that increase the particulates in the exhaust and poison the active sites on the catalyst. Attempts with limited success to solve such a problem have encompassed, for example, Nakatsuji et al. describing the use of selective $SO_x$ adsorbents upstream of lean $NO_x$ trap adsorbents.

Furthermore, catalytic oxidation of NO to $NO_2$ is limited in its temperature range. Oxidation of NO to $NO_2$ by a conventional Pt-based catalyst maximizes at about 250° C. and loses its efficiency below about 100 degrees and above about 400 degrees. Thus, the search continues in the development of systems that improve lean $NO_x$ trap technology with respect to temperature and sulfur considerations.

A technology for the removal of carbon-containing particulates from lean-burn engine exhausts (particularly diesel exhausts) involves trapping such particulates—commonly called the "particulate trap." Particulate traps based upon interception, impaction and/or diffusion collections methods have been shown to significantly reduce carbon particulate emissions from diesel or lean-burn engine exhausts. Such collection methods have been combined with particulate disposal methods based upon electrical, mechanical and/or chemical techniques to achieve complete particulate trap systems. However, current particulate trap systems are expensive and unreliable.

The U.S. Federal Test Procedure for cold starting gasoline fueled vehicles presents a big challenge for lean-$NO_x$ catalysts due to the low-temperature operation involved. Diesel passenger car applications are similarly challenged by the driving cycle that simulates slow-moving traffic. Both tests require reductions of CO, hydrocarbons, and $NO_x$ at temperatures below 200° C. when located in the under-floor position. Current EPA standards for particulate emission limits are approximately 0.1 g/Bhp-hr while $NO_x$ requirements are less than about 4 g/Bhp-hr. Future particulate and $NO_x$ emission standards are even more stringent. Modifications of existing catalyst oxidation technology are successfully being used to address the problem of CO and hydrocarbon emissions, but no cost-effective solution exists for $NO_x$ and particulate emissions.

SUMMARY OF THE INVENTION

An object of the present invention is to provide a method for reducing $NO_x$ and/or particulate emissions.

A further object of the present invention is to provide a vehicle with reduced $NO_x$ and particulate emissions.

A still further object of the present invention is to provide a system for attachment to an engine with an oxygen rich exhaust for the reduction of $NO_x$ and particulate emissions.

Briefly, a $NO_x$ emissions reducer embodiment of the present invention comprises a non-thermal plasma gas treatment combined with a particulate trap to enhance $NO_x$ and/or carbonaceous particulate reduction in oxygen-rich vehicle engine exhausts. A plasma-assisted noncatalytic reduction process of the invention can plasma convert exhaust NO to $NO_2$, and simultaneously trap particulates which (1) emit volatile hydrocarbons for plasma use and (2) evolve carbon soot that reacts with the $NO_2$ to produce benign exhaust products, such as $N_2$ and $CO_2$.

An advantage of the present invention is that a method for $NO_x$ emission reduction is provided that is noncatalytic, yet inexpensive and reliable. The plasma-assisted noncatalytic reduction may allow the use of catalysts to be avoided for relatively inexpensive compliance to $NO_x$ and/or particulate emission reduction laws.

Another advantage of the present invention is that a system is provided for reducing $NO_x$ and particulate emissions.

Furthermore, not only does the plasma-assisted particulate trap process improve the $NO_x$ and particulate removal, but it also allows the combustion of fuels containing relatively high sulfur contents with a concomitant reduction of $NO_x$, particularly in an oxygen-rich vehicular exhaust environment. The present invention allows the use of a non-thermal plasma-assisted particulate trap to reduce $NO_x$ and particulate emissions in engine exhausts, particularly diesel exhausts, containing relatively high concentrations of sulfur, such as greater than 20 ppmw sulfur (calculated as S).

DETAILED DESCRIPTION OF THE INVENTION

Figure 1:
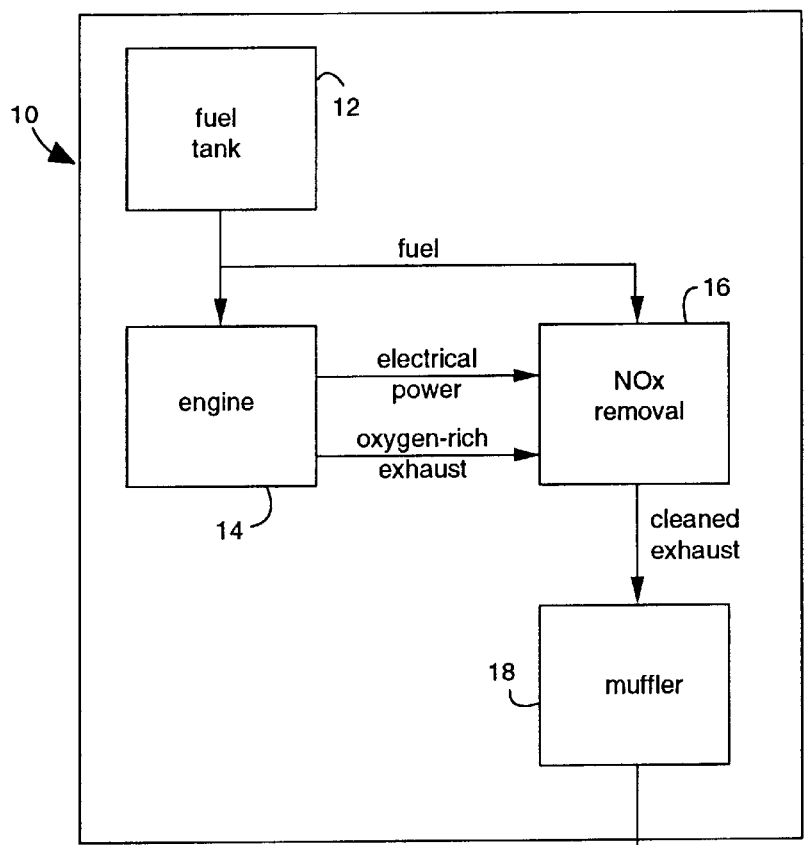
FIG. 1 is a function block diagram of a vehicle embodiment of the present invention.

FIG. 1 illustrates a vehicle embodiment of the present invention, and is referred to herein by the general reference numeral 10. The vehicle 10 is provided with a fuel tank 12 that supplies an internal combustion engine 14 and a $NO_x$ reduction unit 16. The fuel used may be #2 diesel oil and the engine 14 may be a diesel type common to busses and trucks. The engine 14 has an output of exhaust gas that is both rich in oxygen and oxides of nitrogen ($NO_x$), e.g., NO and $NO_2$. Oxygen-rich exhausts are typical of diesel engines and lean-burn gasoline engines. Such $NO_x$ in the exhaust is environmentally undesirable. The exhaust and electrical power, e.g., 12 VDC stepped up to high voltage, are input to the $NO_x$ reduction unit 16. Hydrocarbons in the fuel and a plasma created by the electrical power provided are used in a two-step conversion of hydrocarbons $+NO \rightarrow NO_2$ and $NO_2 \rightarrow N_2, O_2, CO_2$ by the $NO_x$ reduction unit 16. A muffler 18 is used to quiet the otherwise noisy cleaned exhaust.

Figure 2:
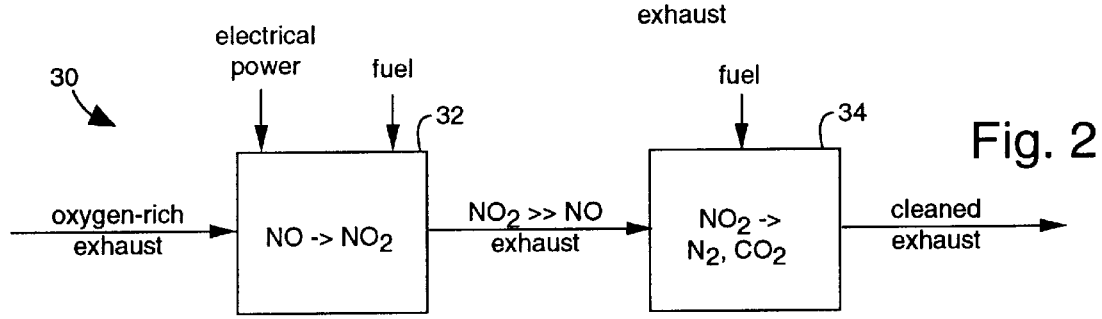
FIG. 2 is a flowchart diagram representing a method of the present invention for $NO_x$ reduction.

FIG. 2 represents a method embodiment of the present invention for $NO_x$ removal in oxygen-rich exhaust flows and is referred to herein by the general reference numeral 30. The $NO_x$ reduction unit 16 of FIG. 1 represents an implementation of the method 30. A step 32 converts the NO in an oxygen-rich exhaust flow to $NO_2$ by mixing hydrocarbon molecules into the oxygen-rich exhaust flow and passing the mixture through a plasma processor or non-thermal electrical oxidizer. Complex hydrocarbons, such as diesel oil, may be reduced to simpler hydrocarbon molecules by cracking the complex hydrocarbon molecules with another plasma processor. The electrical power input is used to drive the plasma processors. In a step 34, a gamma-alumina catalyst is used to convert hydrocarbons and $NO_2$ to more benign products.

Alternatively, a simple hydrocarbon may be supplied to the $NO_x$ reduction unit 16, e.g., propene. Some hydrocarbons may be better reductants or better NO to $NO_2$ promoters. The disadvantage is two different supplies of hydrocarbons must be maintained aboard the vehicle 10.

Figure 3:
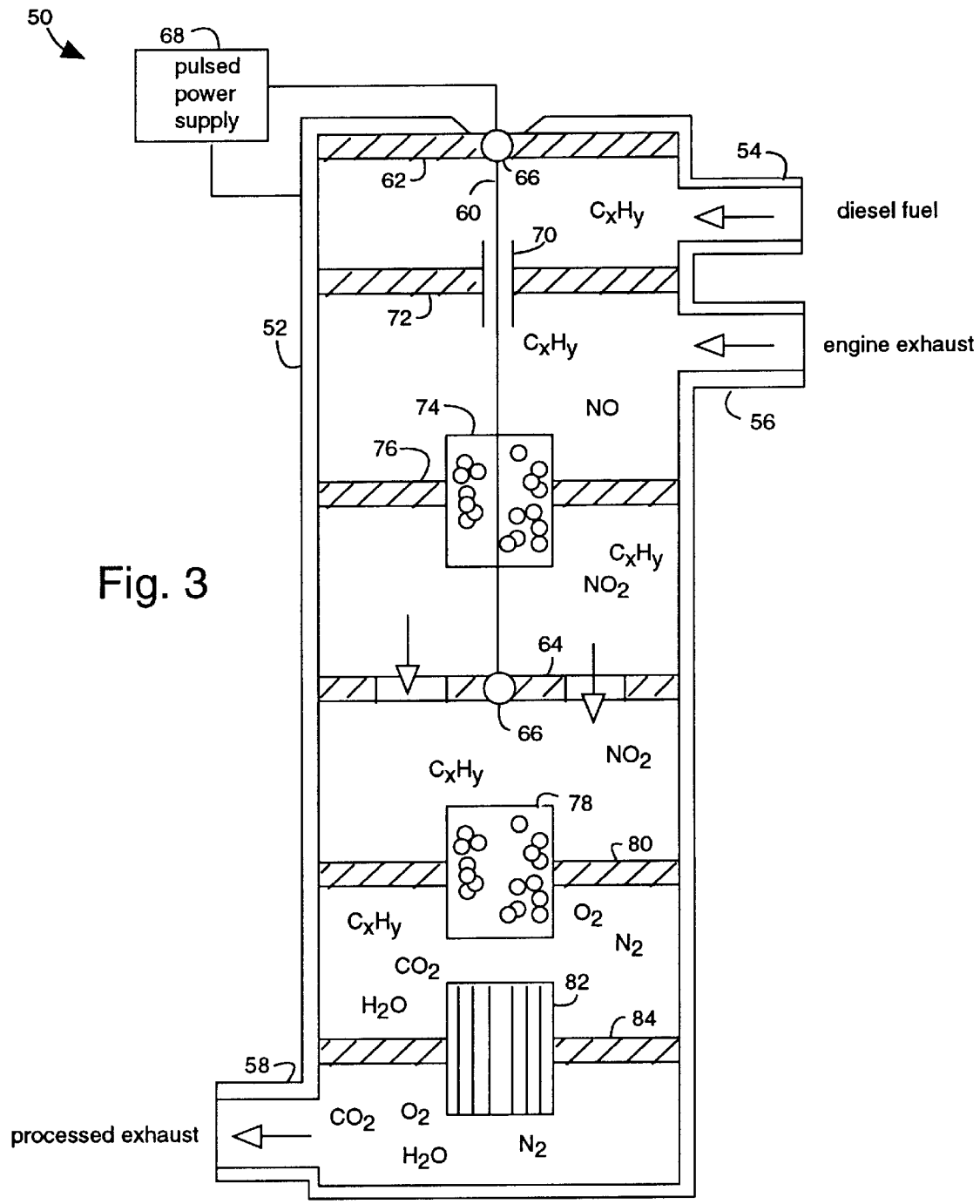
FIG. 3 is a cross sectional diagram representing a $NO_x$ reduction unit embodiment of the present invention.

FIG. 3 diagrams a $NO_x$ reduction unit of the present invention and is referred to herein by the general reference numeral 50. The $NO_x$ reduction unit 50 is similar to the $NO_x$ reduction unit 16 of FIG. 1 and similar in operation to the $NO_x$ reduction method 30 of FIG. 2. The $NO_x$ reduction unit 50 comprises a cylindrical housing 52 with an atomized hydrocarbon inlet 54, an engine exhaust inlet 56 and a processed exhaust outlet 58. The housing 52 need not be cylindrical and can take the form of an exhaust manifold attached to an engine. The higher temperatures afforded by close proximity of the $NO_x$ reduction unit 50 to such engine are preferred. A corona generating wire 60 is concentrically suspended along the axis of the housing 52 between a pair of insulative bulkheads 62 and 64. A number of corona balls 66 are connected at the ends of the wire 60 to prevent electrical breakdown. A pulsed power supply 68 is connected to the corona wire 60 and supplies high-voltage, high-current pulses with variable duty cycles and pulse repetition rates. For example, a voltage of 30,000 volts and a current of 100 amperes with a pulse duration of 100 nanoseconds and a pulse repetition rate of 50–5,000 Hz have provided good results. Such parameters may be made independently variable and microcomputer controlled to accommodate a variety of exhaust flow rates being processed. A preprocessor 70 is constructed as a concentric metal tube that pierces a metal bulkhead 72. The preprocessor 70 cracks the complex hydrocarbons provided from the inlet 54 into simpler hydrocarbons using a non-thermal plasma. The dimensions of the tube and the wire are selected to maintain a field enhancement sufficient to generate the coronal discharge. A stainless steel corona wire 60 with a diameter of 1.5 millimeter and a tube in the preprocessor 70 with an inside diameter of 6.2 centimeters have given good results. If propene or another similar hydrocarbon source is provided to the inlet 54, the preprocessor 70 is unnecessary and may be omitted. A processor 74 held in place by a metal bulkhead 76 uses both the simple hydrocarbons and a non-thermal plasma to convert NO in the flow from the engine exhaust inlet 56 into $NO_2$. A bed of silica beads 4–10 millimeters each in diameter maybe included to help trap and oxidize soot.

The pulsing of the electrical power applied to the corona wire 60 is critically controlled to generate only arc-precursor streamers that bridge the electrode gap within the processor 74 but do not arc. Such a processor is conventional and is variously referred to by artisans as a pulsed corona processor. Alternatively, the corona wire 60 or the inside walls of the processor 74 maybe covered or coated with a dielectric layer to prevent DC arcs. Alternating current electrical power may then be used. Such a processor is known to artisans as a dielectric barrier discharge processor.

A catalytic converter 78 is mounted on a bulkhead 80 and provides for the selective catalytic reduction of $NO_2$ to more environmentally benign molecules, such as $N_2$, $O_2$, $CO_2$ and $H_2O$, using excess hydrocarbons that flow from the processor 74. The catalytic converter 78 may be configured as a bed of gamma alumina pellets, e.g., $\gamma$-$Al_2O_3$. The catalytic converter 78 may also be configured as a wash coat of gamma alumina on a substrate.

An oxidation catalyst 82 is mounted on a bulkhead 84 and provides for the burning of any excess hydrocarbons not consumed by the processor 74 and the catalytic converter 78. Preferably, the flow of hydrocarbons into the inlet 54 is controlled to minimize such excess hydrocarbons that must be burned by the oxidation catalyst 82.

Oxygen enhances the selective catalytic reduction of NO by hydrocarbons. Empirical evidence suggests that the $NO_x$ reduction by lean-$NO_x$ catalysts activate the NO by converting it to $NO_2$, either in the gas phase or on the surface. The $NO_2$ will then be reduced on the catalyst surface when in the presence of hydrocarbons. The gas-phase formation of $NO_2$ is argued to be sufficient to account for the observed rate of $NO_x$ reduction by $\gamma$-$Al_2O_3$. Whether the heterogeneous oxidation of NO also takes place is not clear. The functions of the active sites are complicated because a multitude of reactions happen on the surface. There are sites on which the NO may be activated by oxidation to $NO_2$, sites where the hydrocarbon molecule is activated, sites where the carbon oxides are formed, and sites where the coupling of nitrogen-containing molecules take place. Individual sites may be involved in more than one step, or there may be two or more different sites in close proximity acting as a multi-functional catalyst.

Catalysts that are active in selective catalytic reduction of NO by hydrocarbons have surface acidity, e.g., they possess surface hydroxyl groups. The simplest surface on which selective catalytic reduction by hydrocarbons is observed is the amorphous, acidic form of alumina, known as $\gamma$-$Al_2O_3$. In addition to having the best physical surface structure, e.g. surface area of 100–200 square meters per gram, $\gamma$-$Al_2O_3$ is also the most acidic form of stable alumina.

In the case of oxide-based catalysts, the deactivation of catalyst activity by water vapor may be related to the effect of polar water molecules on certain acidic centers in the catalyst. The deactivation by water is thus pronounced for catalysts in which the acid sites play an active role in NO oxidation, as in producing the important $NO_2$ intermediate. In some catalysts, acid sites are active for NO oxidation, and thus is rate-limiting. Once the NO oxidation sites are deactivated, the catalyst as a whole loses competitiveness for hydrocarbon reduction of $NO_x$ versus hydrocarbon combustion by oxygen, thereby leading to inefficient $NO_x$ removal.

Oxidizing NO to $NO_2$ with a plasma allows the catalyst itself to be devoted exclusively to the selective reduction of $NO_2$ by the hydrocarbons. The plasma uses the hydrocarbons to enhance the oxidation of NO to $NO_2$. In a catalyst, hydrocarbon helps reduce $NO_2$ to $N_2$. Such plasma-assisted catalytic reduction, may be expressed schematically in two steps, e.g., (1) plasma +NO+$O_2$+HC→$NO_2$+HC breakup products, and (2) catalyst+$NO_2$+HC→$N_2$+$CO_2$+$H_2O$, where HC refers to hydrocarbon molecules.

The plasma oxidizes the NO to $NO_2$ in the first step. And the second step breaks the original hydrocarbons into smaller molecules and radicals that could significantly enhance the activity of the catalyst. Thus there is great synergy in combining the plasma with the catalyst.

Since many lean-$NO_x$ catalysts are more active to $NO_2$, compared to NO, a preconversion of NO to $NO_2$ in the plasma is needed to increase the overall $NO_x$ reduction efficiency. The hydrocarbons are used to enhance the NO oxidation process in the plasma, and the hydrocarbons are required for the chemical reduction of $NO_2$ on the catalyst surface.

The plasma-assisted catalytic reduction process is a non-thermal plasma type of atmospheric-pressure plasma. See B. M. Penetrante and S. E. Schultheis, Springer-Verlag, Berlin Heidelberg, 1993. A plasma is produced in which a majority of the electrical energy goes into the production of energetic electrons, rather than gas heating. Electron-impact dissociation and ionization of the background gas molecules allows energetic electrons to be used to produce free radicals, ions and additional electrons which, in turn, oxidize, reduce or decompose pollutant molecules.

The plasma-assisted catalytic reduction process improves the activity and durability of catalysts for $NO_x$ reduction in lean-burn engine exhaust, and enables the use of catalysts that may not require precious metals. The present inventors understand that the plasma is being used to oxidize NO to $NO_2$ and the catalyst which follows is being used to convert the $NO_2$ and hydrocarbons to $N_2$, $CO_2$ and $H_2O$.

The activity for selective catalytic reduction is significantly higher for $NO_2$ compared to that for NO. The relatively higher activity for $NO_2$ has been observed in Cu-ZSM-5 zeolite catalysts. It has also been observed in oxide catalysts consisting simply of $\gamma$-$Al_2O_3$. The selective catalytic reduction activity of a $\gamma$-$Al_2O_3$ catalyst has been verified in experiments.

Figure 4:
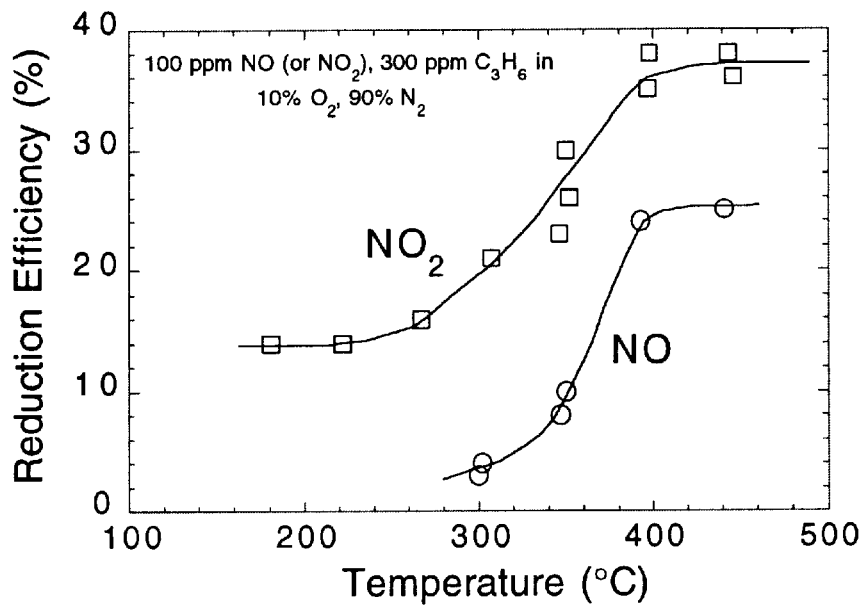
FIG. 4 is a graph showing $NO_x$ reduction efficiency by a gamma-$Al_2O_3$ catalyst as a function of temperature, comparing the two cases where the inlet $NO_x$ is either NO or $NO_2$. The inlet gas concentrations were 100 ppm NO (or $NO_2$), 300 ppm $C_3H_6$ in 10% $O_2$, 90%, $N_2$.

In FIG. 4, the amount of total $NO_x$ reduction was compared with the inlet $NO_x$ being either NO or $NO_2$, and using propene as the reductant. The catalyst consisted simply of pellets of pure $\gamma$-$Al_2O_3$. The reduction efficiency of the catalyst was higher for $NO_2$ compared to that of NO, e.g., with using a plasma. The $NO_x$ reduction is attributed entirely to the catalyst. The concentrations of NO and $NO_2$ were detected and quantified by both chemiluminescence and infrared absorbance. The $NO_x$ reduction is presumably due to $N_2$, since the amount of $N_2O$ and any other oxides of nitrogen, like $HONO_2$, is negligible compared to the reduction in $NO_x$ concentration. The maximum $NO_x$ reduction efficiency shown in FIG. 4 could be increased by increasing the amount of $\gamma$-$Al_2O_3$ and/or decreasing the gas flow rate.

The hydrocarbon-enhanced oxidation of NO to $NO_2$ in a plasma appears to have been verified in experiments. The figures will show the concentrations of NO and $NO_2$ as functions of the electrical energy density applied to the plasma, e.g., electrical power input divided by the total gas flow rate. The processes that determine the concentrations of NO and $NO_2$ can be attributed entirely to reactions in the gas phase. The plasma was produced by a pulsed corona reactor, which consisted simply of a wire in a metal pipe. The plasma reactor was driven by a pulsed high-voltage power supply.

The electrons in the plasma lead to two important dissociation processes, $$e + N_2 \rightarrow e + N + N, \text{ and} \qquad (1)$$

$$e + O_2 \rightarrow e + O + O. \qquad (2)$$

The nitrogen atoms produced in electron-impact reaction (1) can lead to the desirable chemical reduction of NO via the reaction, $$N + NO \rightarrow N_2 + O . \qquad (3)$$

The oxygen atoms produced in electron-impact reaction (2) leads to the chemical oxidation of NO to $NO_2$, $$O + NO + M \rightarrow NO_2 + M, \qquad (4)$$

where M is any molecule acting as a third body reactant.

In mixtures containing 5% or more $O_2$, as in lean-burn engine exhausts, analyses of the electron-molecule collision cross sections have shown that the probability for dissociation of $O_2$ is much higher than that for dissociation of $N_2$. The oxidation reaction (4) dominates over the reduction reaction (3).

Figure 5:
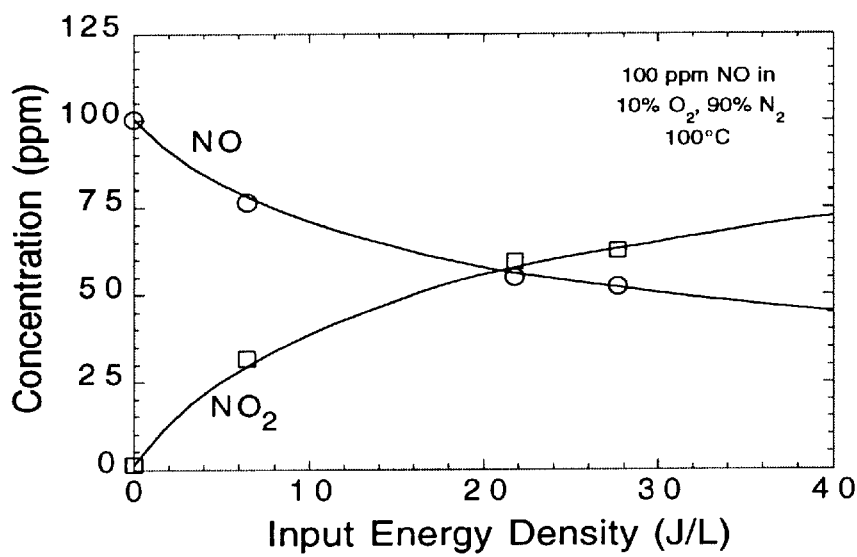
FIG. 5 is a graph showing the effect of plasma processing on the NO and $NO_2$ concentrations, at a gas temperature of 100° C. The concentrations are shown as functions of the electrical energy density (in units of Joules per standard liter of exhaust gas) applied to the plasma. The inlet gas concentrations were 100 ppm NO in 10% $O_2$, 90% $N_2$.

Experimental evidence for such is shown in FIG. 5 for a gas temperature of 100° C. A decrease in NO concentration can be attributed entirely to oxidation to $NO_2$. For gas temperatures around 300° C. or more, which are more typical of engine exhausts, another reaction becomes important, $$O + NO_2 \rightarrow NO + O_2. \qquad (5)$$

Reaction (5) will compete with reaction (4) when the gas temperature is high. The net result is a decrease in the amount of NO that can be oxidized to $NO_2$.

Figure 6:
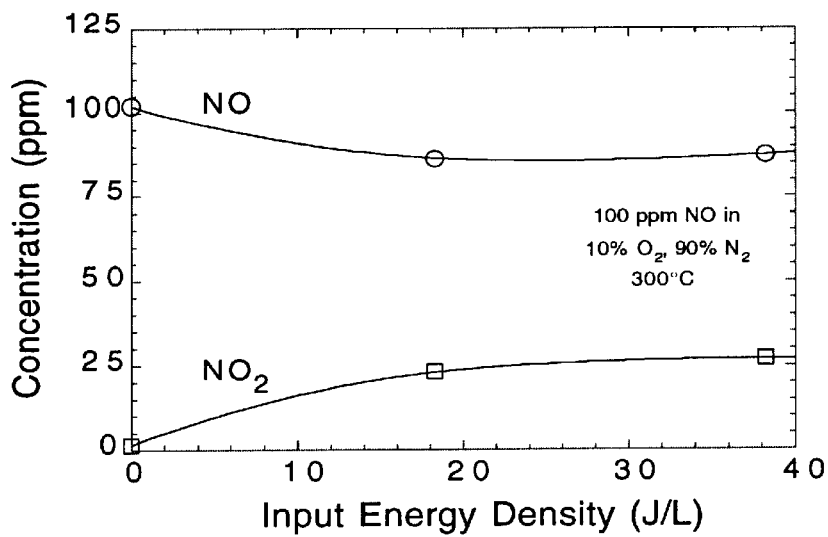
FIG. 6 is a graph showing the effect of plasma processing on the NO and $NO_2$ concentrations, at a gas temperature of 300° C. The inlet gas concentrations were 100 ppm NO in 10% $O_2$, 90% $N_2$.

FIG. 6 shows the experimental evidence for such for a gas temperature of 300° C.

Figure 7:
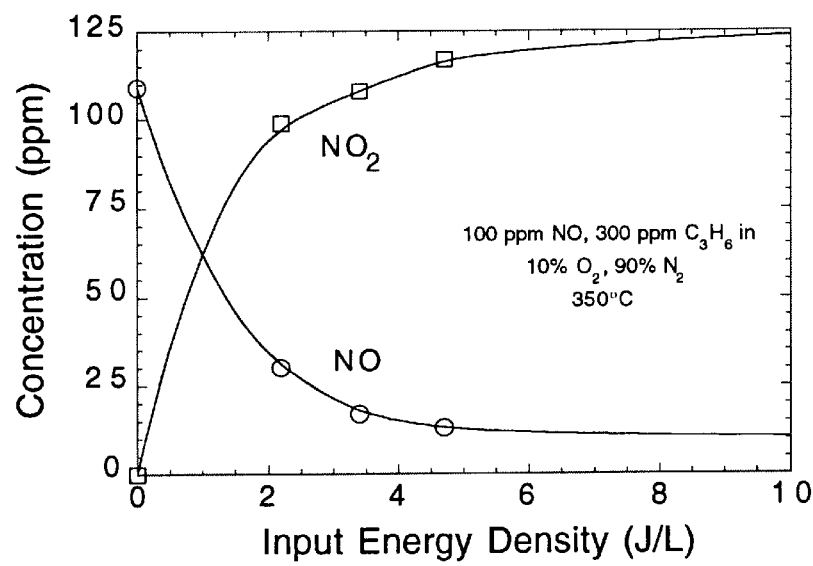
FIG. 7 is a graph showing hydrocarbon-enhanced oxidation of NO to $NO_2$ in a plasma, at a gas temperature of 350° C. The inlet gas concentrations were 100 ppm NO, 300 ppm $C_3H_6$ in 10% $O_2$, 90% $N_2$.

In the presence of hydrocarbons, the O radicals will react with the hydrocarbon molecules to produce very reactive hydrocarbon intermediates that can serve to enhance the oxidation of NO to $NO_2$ even at high gas temperatures. The decomposition of one $C_3H_6$ molecule by one O radical can lead to the oxidation of several NO molecules. Experimental evidence for propene-enhanced oxidation of NO to $NO_2$ in a plasma is shown in FIG. 7. In the presence of hydrocarbons, it is possible to oxidize a large fraction of the initial NO at high gas temperatures. Furthermore, the electrical energy required for the plasma oxidation process is small.

Figure 8:
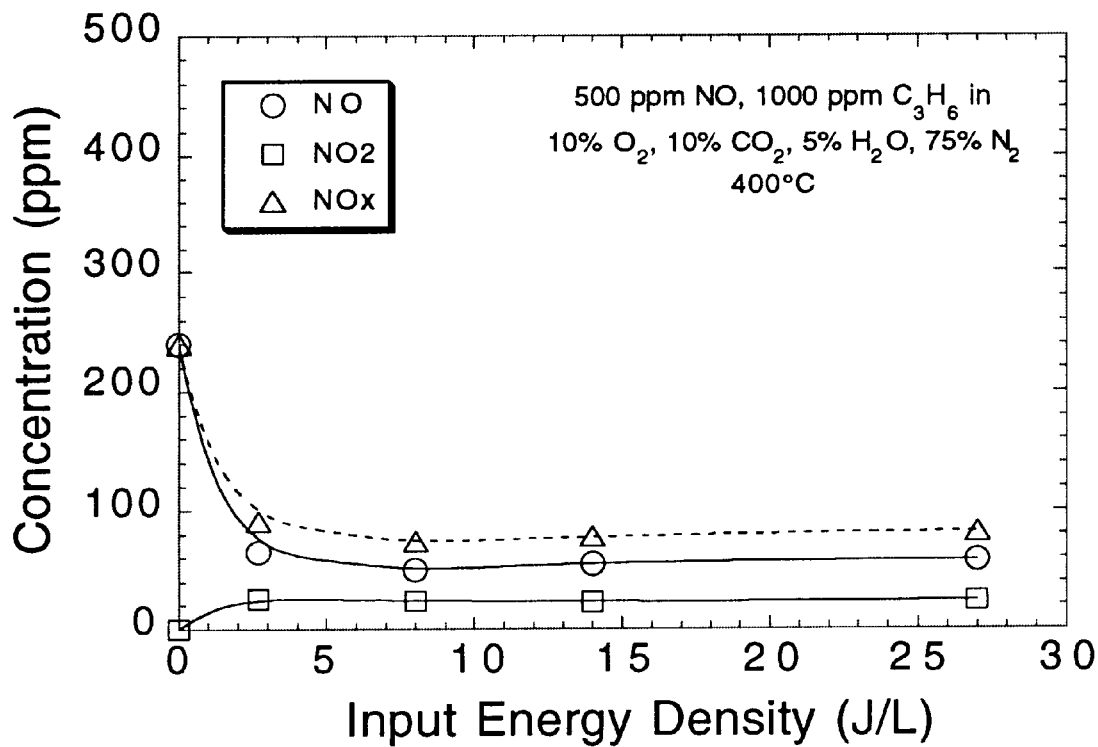
FIG. 8 is a graph showing Plasma-Assisted Catalytic Reduction of $NO_x$. The temperature was 400° C. The NO, $NO_2$ and total $NO_x$ ($NO+NO_2$) concentrations are shown as functions of the electrical energy density applied to the plasma. The inlet gas concentrations were 500 ppm NO, 1000 ppm $C_3H_6$ in 10% $O_2$, 10% $CO_2$, 5% $H_2O$, 75% $N_2$.

The combination of a plasma with known lean-$NO_x$ catalysts enhances the selective catalytic reduction of NO by hydrocarbons. FIG. 8 shows a typical result for the case in which both the plasma and catalyst are present. The NO, $NO_2$ and total $NO_x(NO+NO_2)$ concentrations are shown as functions of the electrical energy density applied to the plasma. The inlet gas concentrations were 500 ppm NO, 1000 ppm $C_3H_6$ in 10% $O_2$, 10% $CO_2$, 5% $H_2O$, 75% $N_2$. At zero energy input, there is no plasma. With the catalyst alone, about 250 ppm of the initial 500 ppm NO is reduced. The catalyst consisted simply of pellets of pure $\gamma$-$Al_2O_3$. As the electrical energy applied to the plasma is increased, some of the initial NO molecules are oxidized to $NO_2$. Because of the high selective catalytic reduction activity of the catalyst with respect to $NO_2$, the amount of total $NO_x$ reduction increases. The plasma enhances the amount of total $NO_x$ reduction, and the enhancement increases as the electrical energy density applied to the plasma is increased. It is apparent that the enhancement in total $NO_x$ reduction by the catalyst is due to the conversion of NO to $NO_2$ in the plasma. With an input energy density of only 5 J/L, up to 80% $NO_x$ reduction could be achieved with the plasma-assisted catalytic reduction method.

There is some evidence suggesting that the $NO_x$ reduction process on the surface begins with the chemisorption of hydrocarbons and then the activation of these hydrocarbons through the formation of some intermediate species. The hydrocarbon intermediate may be char on the surface, a nitro compound, or an oxygenated hydrocarbon. Some evidence exists for zeolite-based catalysts that the intermediate is a nitro compound. This is primarily deduced from surface infrared absorption studies allowing the reaction to take place in an in-situ cell. On Ce-ZSM-5, it was observed that the disappearance of the band associated with $CH_3NO_2$ was strongly correlated with the appearance of nitrogen. No other bands showed the same behavior. The surface nitro compound is suggested to react with $NO_2$ rather than with NO to form $N_2$ and $N_2O$. Other suggestions are that the surface intermediate is a hydrocarbon-type char. Propene adsorbs and is, itself, converted to a char, while simultaneously reducing Cu from the II state to the I state. The NO then interacts in an unspecified fashion with the char to form nitrogen, carbon dioxide and oxygen. Temporal analysis of products for Cu-ZSM-5 also supports the formation of a char on the acidic sites which interacts with $NO_2$ adsorbed on the Cu sites to form the desired nitrogen product. In another case involving Cu-ZSM-5, oxygenated hydrocarbon species have been observed to promote the reduction of NO. On $\gamma$-$Al_2O_3$, the formation of carbonaceous deposits from hydrocarbon cracking was found to correlate with the selective catalytic reduction activity. Another proposal for the action of the hydrocarbon in $NO_x$ reduction is based on the temporal analysis of products for Pt on $\gamma$-$Al_2O_3$. Still others suggest that the primary purpose of the hydrocarbon is to reduce platinum, allowing the platinum to be oxidized by NO, thus producing nitrogen.

The final step in the reduction of $NO_x$ to $N_2$ has to include the pairing of the nitrogens. The main kinetic barrier to overcome in the catalytic reduction of $NO_x$ to $N_2$ is the coupling of nitrogens. The coupling mode probably depends on the type of catalyst. In a study of decomposition of NO over Cu-ZSM-5, the surface reactions appear to be complex, going through all of NO, $N_2O$ and $NO_2$ intermediates, before finally yielding nitrogen and oxygen. It is believed that the two N species get together over a single Cu site. The $N_xO_y$ species involved are all as surface intermediates adsorbed directly on the copper.

For the case of a simple oxide catalyst such as $\gamma$-$Al_2O_3$, the pairing between an $NO_2$ molecule striking from the gas and an adsorbed N-containing surface entity may be a conceivable pathway. The N-containing surface reactant could be in the form of an isocyanate intermediate or carbonaceous deposit.

A method embodiment of the present invention for reducing nitrogen oxides ($NO_x$) in engine exhausts comprises the steps of, (1) converting substantially all NO in an engine exhaust to an intermediate gas flow including $NO_2$, and (2) converting substantially all of said intermediate gas flow including $NO_2$ to an output gas flow comprising $NO_2$ conversion products of $N_2$ and $O_2$ and substantially little $NO_x$. The $NO_x$-containing exhaust may be produced by other types of high-temperature combustion sources such as gas-fired burners, coal-fired power generators, and thermal incinerators. The step of converting substantially all NO in an exhaust to an intermediate gas flow including $NO_2$ can alternatively include the use of a plasma converter, an oxidizing catalyst, or a selective catalytic reduction (SCR). For example, catalyst can be used that can directly decompose $NO_2$ to $N_2$ and $O_2$ in the absence of hydrocarbons or other additives including nitrogen-containing reductants such as ammonia, urea or cyanuric acid.

The step of converting substantially all of said intermediate gas flow including $NO_2$ to an output gas flow comprising little $NO_x$ can alternatively include the use of a catalyst that is more active for reduction of $NO_2$ than of NO, or the use of a catalyst with high surface area and high surface acidity, or one composed of a highly-acidic form of gamma alumina or silica. The catalyst may also be composed of a base metal oxide or a supported noble metal catalyst.

The step of converting substantially all NO in an exhaust to an intermediate gas flow including $NO_2$ preferably includes the use of an electrical discharge plasma cell with one or more pair of electrodes to which high-voltage is provided. A voltage generation means for providing direct current, alternating current or pulsed high voltage waveform is connected to the electrodes. The gases to be treated are conducted through the volume between or in the vicinity of the electrodes.

The step of converting substantially all NO in an exhaust to an intermediate gas flow including $NO_2$ can alternatively include the use of an electron beam-generated plasma cell with an electron gun having a thermionic or cold plasma cathode. A voltage generation means is included to provide direct current, alternating current or pulsed voltage waveform to the electron gun. The vacuum provided for the electron gun must be separated from the high pressure region with the gases that are processed but still allow the gasses to be irradiated. A solid dielectric-barrier material can used adjacent to one or more of the high-voltage electrodes. Alternatively, a liquid layer can be used adjacent to one or more of the high-voltage electrodes to act as a dielectric-barrier and/or a process product scrubber. The high-voltage electrodes can be imbedded within a solid dielectric such that a surface discharge plasma is produced. The volume between one or more pairs of electrodes can be packed with dielectric pellets or glass wool, or other dielectric materials, that allow the gas to pass through the volume. The electrodes can also be coated with a layer of catalytic material and/or mechanically articulated to vary the electrode gap between points on the surface of opposing electrodes. The dielectric material used can be an oxidation catalyst that converts NO in an exhaust to an intermediate gas flow including $NO_2$, or a SCR catalyst that converts $NO_2$ formed in the plasma to a gas flow containing less $NO_x$.

The hydrocarbons mentioned herein, may be selected from the group of alkanes, alkenes, alkynes, aromatics, alcohols, aldehydes, ketones, ethers, and esthers.

Nitrogen-containing reductants such as ammonia, urea or cyanuric acid can be introduced in the step of converting substantially all of the intermediate gas flow including $NO_2$ to an output gas flow.

The step of converting substantially all NO in an exhaust to an intermediate gas flow including $NO_2$ may include the use of a solid electrochemical cell having one or more pair of electrodes to which low-voltage is provided, a voltage generation means providing direct current, alternating current or pulsed low voltage waveform to the electrodes, and conducting the gases to be treated through the volume in the vicinity of the electrodes.

The step of converting substantially all NO in an exhaust to an intermediate gas flow including $NO_2$ may also include the use of a plasma converter functioning as an electrostatic precipitator or particulate trap, or that oxidizes carbonaceous particles, such as soot, to carbon oxides ($CO_x$) and $H_2O$. A reactive gas can be introduced to enhance the oxidation of NO to $NO_2$, or $NO_2$ to $N_2$ and $O_2$.

The present invention includes a method for reducing nitrogen oxides ($NO_x$) and particulates in engine exhausts from high-temperature combustion. Engine exhausts passed directly from combustion sources in an engine are commonly called "engine out" exhaust, whereas engine out exhausts that have been treated to reduce environmentally harmful contaminants, e.g., NO, $NO_2$, NMHC (nonmethane hydrocarbons) and carbonaceous particulates, are commonly referred to as tail pipe emissions. As used herein, "engine exhaust", "exhaust gas" or simply "exhaust" refer(s) to engine out exhausts, and "output gas flow" or simply "emission(s)" refer to tail pipe emissions. The exhausts contemplated for treatment by the present invention contain greater than 2.4, and often greater than 4 g/bhp-hr of $NO_x$+NMHC or greater than 2.5, and often greater than 4 g/bhp-hr of $NO_x$+NMHC with a limit of 0.5 g/bhp-hr of NMHC. The exhaust may also contain at least 0.5, often at least 2, and more often at least 4 g/bhp-hr of $NO_x$. These same exhausts also contain at least 0.05, often at least 0.1, and more often greater than 0.45 g/bhp-hr of the particulates. After treatment by the method of the invention the output gas flow (tailpipe emissions) contains less than 4, preferably less than 2.5, more preferably less than 2, and most preferably less than 0.5 g/bhp-hr of $NO_x$. The output gas flow also contains less than about 0.45, preferably less than 0.1 g and most preferably less than 0.05 g/bhp-hr of the particulates. The output gas flow most preferably contains less than about 0.05 g/bhp-hr of the particulates and less than about 0.5 g/bhp-hr of $NO_x$+NMHC.

The present method normally includes the steps of initially converting substantially all NO in an engine exhaust with a non-thermal plasma to an intermediate gas flow including $NO_2$ while also collecting carbonaceous particulates from the engine exhaust. The method further includes converting substantially all of the intermediate gas flow including the plasma produced $NO_2$ in the presence of the collected particulates to an output gas flow that contains $NO_2$ conversion products of $N_2$, $CO_2$ and in some cases $H_2O$. The collected particulates contain both volatile hydrocarbons and carbon soot. Normally substantially little carbon soot (C), NO and $NO_2$ ($NO_x$) are contained in the resulting output gas flow.

The engine exhaust is usually passed from a source of combustion, more particularly an internal combustion engine such as a lean-burning gasoline engine or a diesel fuel burning engine, to the non-thermal plasma reaction zone. The intermediate gas flow is preferably located within the plasma reactor where $NO_2$ is produced. The intermediate gas flow is preferably converted to the output gas flow in the plasma reactor, in the presence of the collected particulates, and passed through any apparatus (if necessary) operably connected from the plasma reactor to an emissions outlet, such as a tail pipe on a vehicle such as an automobile or truck.

The particulate trap apparatus of the invention is comprised of materials that are resistant to hot gas environments, and more particularly to be operably connected to and withstand the conditions of the plasma and its operation. The particulate trap is adapted to collect exhaust particulates by collection methods including impaction, interception, diffusion and combinations thereof. Impaction methods include the use of wire mesh, perforated cylinders, and the like. Interception methods include the use of filters such as ceramic monolithic materials having porous ceramic thin walls, as for example, SiC coated alumina fiber filters. Interception methods are based upon the particulate size being larger than the pores of the filter, etc. Diffusion methods also include filters, however, the pore of the filter may not be smaller than the particulates, but collected due to the random nature of particulate flow in the exhaust gas. An example of a diffusion filter includes a support housing one or more perforated metal tubular components having filter elements containing silica woven thread fiber. Such collection methods generally have trapping efficiencies of about 80–95% for carbonaceous particulates and about 40–65% for soluble organic fractions.

Figure 9:
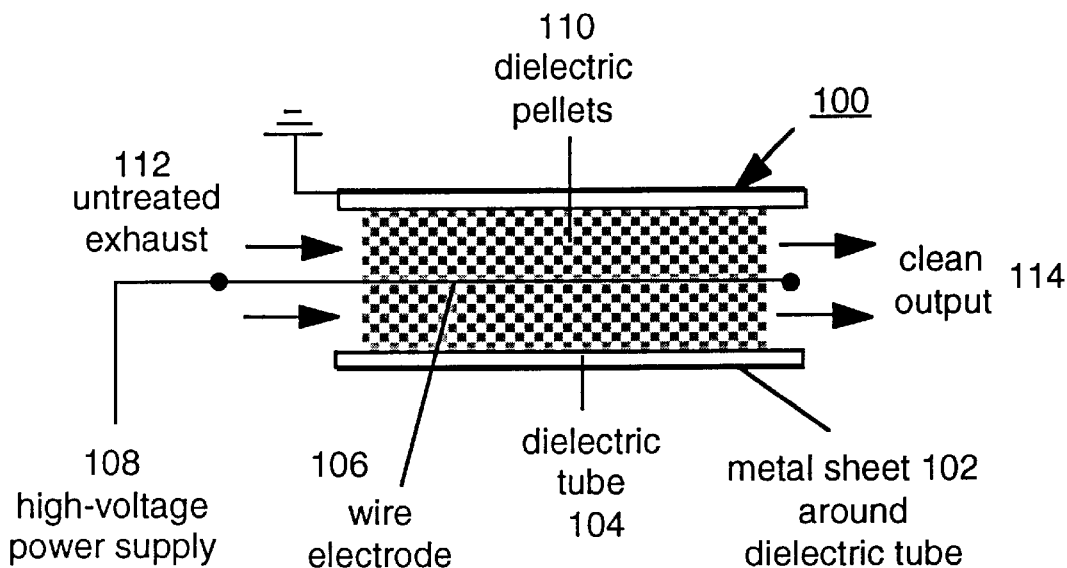
FIG. 9 is a side view of a single reactor plasma-assisted particulate trap showing particulate collection by electrostatic impaction.

In one embodiment of the invention wherein both $NO_2$ production and its subsequent reaction with carbon soot occurs in the same chamber, a plasma-assisted particulate trap apparatus includes dielectric pellets inside an electrical discharge plasma. FIG. 9 illustrates a pellet bed plasma reactor 100 having an outer cylindrical metal support tube 102 having an inner dielectric tube liner 104 wherein the cathodic support and liner are coaxially disposed about a wire anode 106 throughwhich pulse or alternating electrical current is passed at high voltage from a high voltage source 108. Dielectric pellets in pellet bed 110 are enclosed within the metal support tube and liner surrounding the wire anode.

In operation, a particulate-containing exhaust gas passes into an intake end 112 of the metal support tube and either a pulsed or a sinusoidal electrical high voltage is applied to the reactor from source 108 via wire anode 106 to form an intense electric field around each pellet. The plasma creates ions in the gas that consequentially provide charge to the particulates. Once charged, the particulates can be collected (impacted) effectively onto the pellet surfaces by the intense electrical force, i.e., the particulates are electrostatically collected. Since the efficiency for particulate collection is related (usually proportional) to the surface area of the particulate collection surfaces, e.g., pellets, the surface area per unit volume of the collection surfaces, e.g., pellets, can be increased or decreased depending upon the selected pellet sizes, particulate amounts and flow rates, etc. As the intake exhaust gas flow passes through the pellet bed holding the charged particulates, a plasma is formed and the NO in the intake exhaust is converted by the electrically created plasma to an intermediate gas containing $NO_2$ while simultaneously, volatile hydrocarbons from the particulates are oxidized in the plasma. The energy requirement for the plasma oxidation of NO to $NO_2$ is reduced considerably due to the presence of additional hydrocarbons from the particulates. The remaining carbon soot portion of the particulates then reacts with the $NO_2$ in the intermediate gas flow to produce an output gas containing $CO_2$ and $N_2$, which exits the support tube 102 through gas outlet 114.

Figure 10:
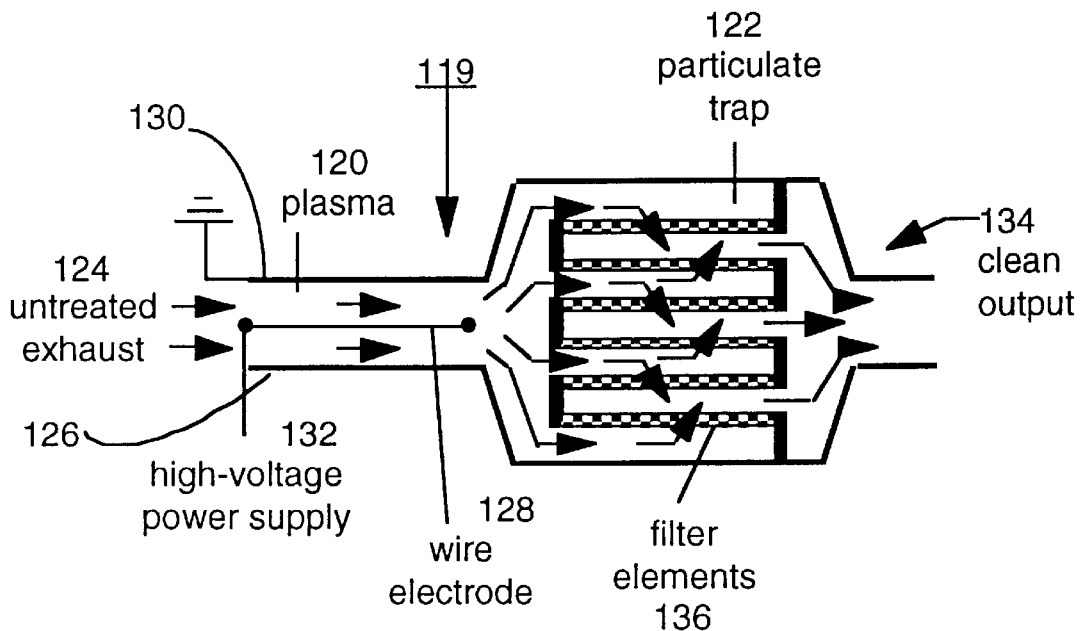
FIG. 10 is a side view of a plasma reactor upstream of a particulate trap reactor showing particulate collection by interception and diffusion.

FIG. 10 illustrates a two reactor embodiment, shown generally as 119, wherein $NO_2$ produced in a first stage plasma reactor 120 is reacted with particulates collected in a downstream second stage particulate trap reactor 122. Untreated engine exhaust gas flow 124 containing particulates is fed into reactor 120 through inlet 126 wherein a high voltage supplied from a high voltage supply 132 is applied across a central high voltage wire electrode (anode) 128 and cathodic support cylinder 130 that encases the first reactor to produce a plasma between the electrodes in the exhaust. Such a plasma reactor is suitable for the application of a pulsed high voltage. The plasma partially comprises particulates contained in the exhaust gas flow that emit volatile hydrocarbons as they pass through the plasma reactor 120. Such particulates are then collected in particulate trap reactor 122 by a combination of interception and diffusion methods. Porous filter elements 136 of particulate trap reactor 122 provide a surface for collection of the particulates and allow passage therethrough of the gaseous components. After the intermediate plasma-produced $NO_2$ gas exits the plasma reactor 120 and enters particulate trap 122, the carbon soot portion of the trapped particulates on the surface of porous filter elements 136 react with such $NO_2$ gas to produce $N_2$ and $CO_2$ that escapes through pores of the filter. An output gas flow containing $N_2$ and $CO_2$ and containing essentially little NO and/or $NO_2$ exits through gas outlet 134.

The constituents, i.e., components, of the engine exhaust particulates collected according to the invention generally comprise up to about 50 wt. % of dry (solid) carbon (commonly called carbon soot), and up to about 45 wt. % of a liquid phase hydrocarbon portion (commonly called the volatile organic fraction) known herein as volatile hydrocarbons. In the case of diesel particulates, such volatile hydrocarbons are a combination of unburned diesel fuel (typically up to about 15 wt. %) and lubricating oil (typically up to about 40 wt. %). Normally at least some of each of such components is found in the particulates. Table 1 summarizes relative percentages of representative particulate components of a sample of diesel exhaust particulates.

TABLE 1

| Diesel particulate component | Weight Percent |
|---|---|
| Carbon soot | 44 |
| Heavy volatile HC (from unburned lube oil) | 31 |
| Heavy volatile HC (from unburned fuel) | 12.5 |
| Sulfate (from sulfur in fuel) and $H_2O$ | 8.5 |
| Remainder (primarily ash from lube oil) | 4 |

Although conventional particulate traps involve a step or steps for regenerating the particulates, such is not necessary in the present invention. The carbon soot portion of the collected particulates is utilized in the invention to reduce the $NO_2$ of the intermediate gas flow to $N_2$ during the oxidation of the carbon soot to $CO_2$. Oxidizing NO to $NO_2$ with a plasma allows the carbonaceous particulates collected in the particulate trap to be devoted almost exclusively to the conversion of $NO_2$ to $N_2$ in the presence or absence of hydrocarbons. A feature of the invention is the non-thermal plasma interacting with the volatile hydrocarbon portion of the collected particulates to enhance the oxidation of NO to $NO_2$. Such plasma-assisted $NO_x$ and particulate reduction may be expressed schematically in two steps, e.g., (1) plasma $+NO+O_2+HC \rightarrow NO_2+HC$ breakup products, and
(2) $2C+2NO_2 \rightarrow N_2+2CO_2$ where HC refers to hydrocarbon molecules from the exhaust and from the volatile portion emitted from the particulates, and C refers to the remaining carbon soot from the particulates. In some cases, relatively little HC is provided for the plasma from the exhaust, but usually at least 10 wt. %, and preferably at least 25 wt. % of the collected particulates provide volatile HC for the method of the invention.

The plasma oxidizes the NO to $NO_2$ in the first (1) step. In the plasma, the oxidation of NO to $NO_2$ is strongly coupled with the hydrocarbon oxidation chemistry. The hydrocarbon promotes the oxidation of NO to $NO_2$, thus decreasing the amount of electrical energy required by the plasma. The plasma produces active free radicals by electron-impact dissociation of the background gas molecules $O_2$ and $H_2O$. These radicals decompose the hydrocarbon molecules, leading to the production of $HO_2$ and $RO_2$ radicals, where R is a hydrocarbon radical resulting from the dissociation of the hydrocarbon. The NO is then oxidized by:

$NO+HO_2 => NO_2+OH$     (a)

$NO+RO_2 => NO_2+RO$     (b)

The OH radical is reproduced during the oxidation of NO to $NO_2$, thus leading to a very efficient cyclic process. An advantage of the present invention is that the hydrocarbon molecules prevent the oxidation of $NO_2$ to nitric acid. Because the OH radical reacts preferentially with the hydrocarbon, the OH is not available to convert $NO_2$ to nitric acid.

The second (2) step is allowed to proceed after the production of the $NO_2$ by the non-thermal plasma wherein the remaining carbon soot from the collected particulates reacts with such $NO_2$ to produce the benign $N_2$. In some instances, the second (2) step also includes the breaking of the original hydrocarbons into smaller molecules and radicals that significantly enhance the simultaneous conversion of the remaining carbon soot to $CO_2$ by $NO_2$ during the $NO_2$ conversion to $N_2$.

Thus, there are inherent advantages in combining the plasma with the particulate trap to simultaneously oxidize NO and the emitted hydrocarbons from the trapped particulates. Since conventional $NO_x$ reduction catalysts are more active toward the reduction of $NO_2$, rather than to NO, a noncatalytic preconversion of NO to $NO_2$ in the plasma is desirable to increase the overall $NO_x$ reduction efficiency. The volatile hydrocarbons from the trapped particulates are used to enhance the NO oxidation process in the plasma, and the particulates are also present for the subsequent chemical reduction of $NO_2$ to $N_2$ by the remaining carbon soot on the particulate surface.

Oxygen enhances the reduction of $NO_2$ by hydrocarbons in conventional catalytic and particulate trap systems as well as the noncatalytic system of the invention. Conventional catalyst schemes have catalytic sites that can activate the NO by converting NO to $NO_2$, either in the gas phase or on the surface. In conventional $NO_x$ reduction catalysis, the precious metal based catalysts that are active in converting NO to $NO_2$ are also active in converting $SO_2$ obtained from organosulfur components of combustible fuels and exhausts therefrom to $SO_3$. Prior to the noncatalytic plasma pretreatment to $NO_2$ by the present invention, $SO_3$ has competed with $NO_2$ for adsorption and/or conversion at the active sites of the $NO_x$ reduction catalysts and caused poisoning of the active sites on such catalysts. The $SO_3$ has further caused the formation of sulfuric acid and/or sulfate-containing particulates in the exhaust.

The oxidation of NO to $NO_2$ by the non-thermal plasma with little (i.e., less than 1 vol. %) accompanying conversion of $SO_2$ to $SO_3$ by the non-thermal plasma allows the produced $NO_2$ to react with the carbon soot portion (C) of the trapped carbon-containing particulates to produce $CO_x$ gases (predominantly $CO_2$) while in the presence of relatively high sulfur concentrations, usually in the form of organosulfur components of the fuel and/or the resultant sulfur-containing exhaust products, including sulfate in the carbon particulates. Accordingly, the present invention allows the removal of $NO_x$ and particulates from engines burning fuels and exhausts therefrom containing greater than about 5, preferably greater than about 20, and often in the range from greater than about 50 to about 500 ppmw of sulfur components, calculated as S.

Figure 11:
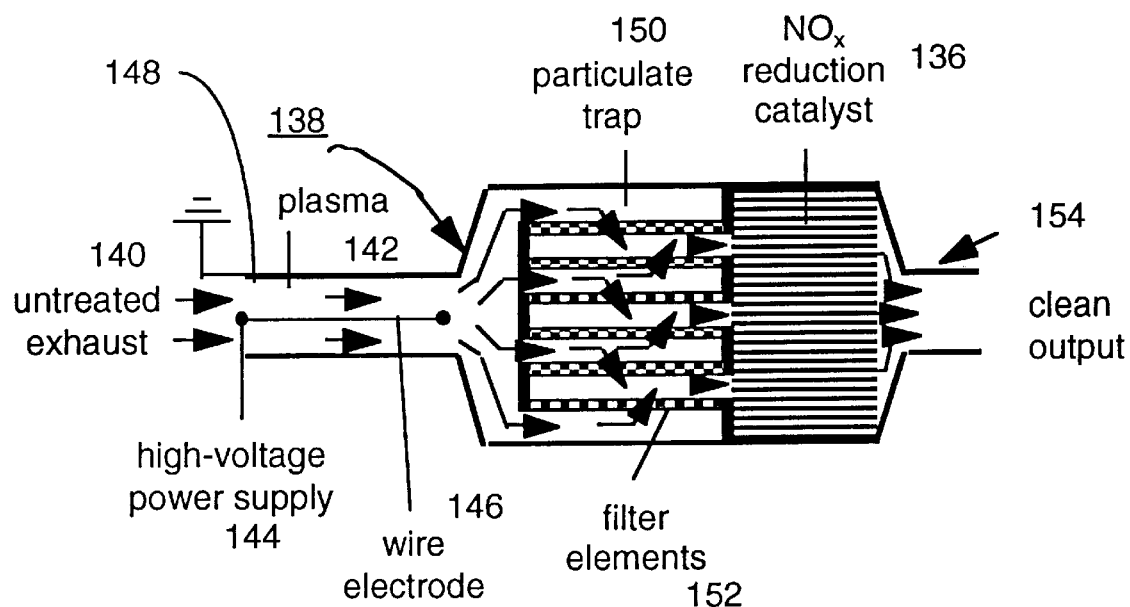
FIG. 11 is a side view of a plasma reactor upstream of a particulate trap reactor which is upstream of a catalytic reactor.

Under undesirable engine combustion conditions, the output gas flow from the particulate trap reactor may still contain emissions above the mandated levels. For example, the initial exhaust and/or the output gas flow from the particulate trap may contain an excessively larger amount (in g/bhp-hr) of $NO_x$ than that of the particulates. In such instances, a $NO_x$ reduction catalyst, e.g., SCR or $NO_x$ trap catalysts, can be employed downstream of such output gas flows. FIG. 11 illustrates an embodiment of the invention wherein a $NO_x$ reduction catalyst 136 is operably connected downstream of the plasma/particulate trap reactor combination illustrated in FIG. 10. Shown generally as plasma/particulate trap/catalytic reactor 138, the untreated exhaust 140 is fed to a plasma reactor 142 where a plasma is formed by application of high voltage from a power supply 144 across a central wire anode 146 to a grounded cylindrical support tube 148. NO in the exhaust 140 is converted to $NO_2$ which is passed to a particulate trap 150 wherein collected particulates in filter elements 152 react with the $NO_2$ for a substantial reduction of $NO_2$ and a simultaneous conversion of carbon soot to $CO_2$. The $NO_x$ reduction catalyst 136 is arranged to receive the output gas flow from particulate trap 150 so as to provide contact surface and sufficient residence time for the catalytic active sites and the unconverted $NO_x$ gases. Further conversion of undesirable components of the exhaust and output gas flow in the catalyst chamber (reactor) produces a clean output emission gas according to mandated standards.

Figure 12:
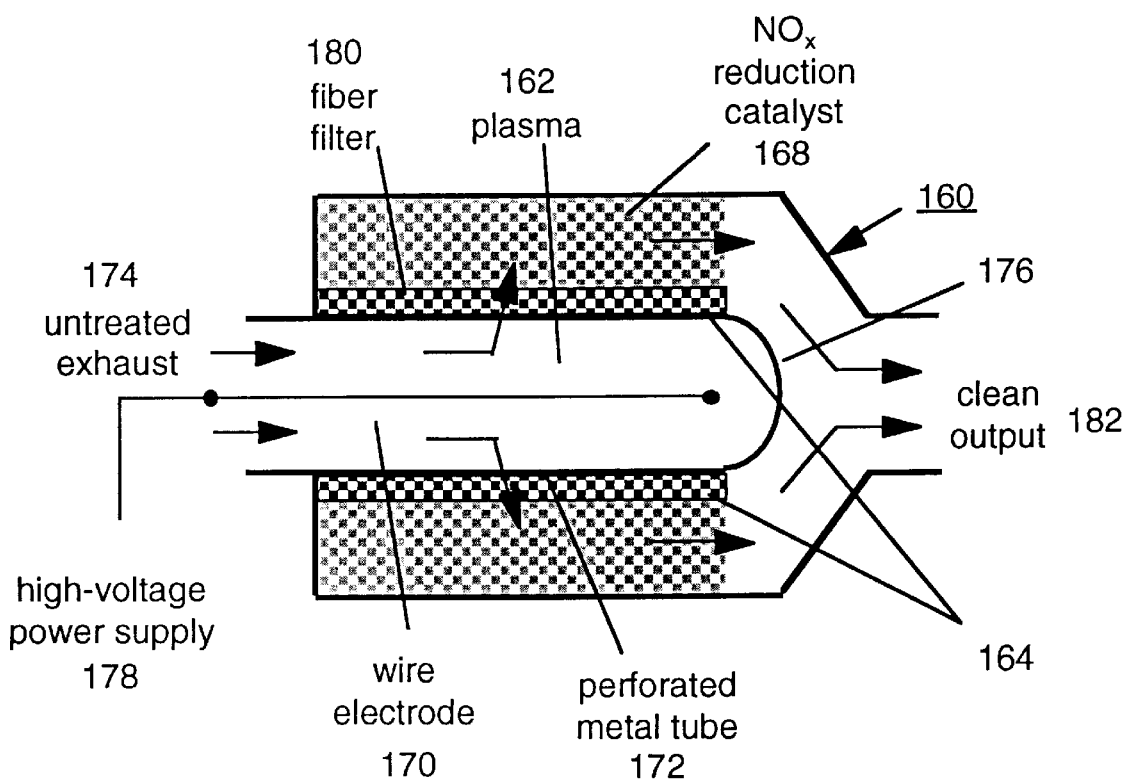
FIG. 12 is a side view of a particulate trap reactor cylindrically concentric about a plasma reactor therewithin and, optionally, having a catalytic converter cylindrically concentric about the trap.

In a preferred embodiment of the invention illustrated in FIG. 12, shown generally as combination reactor 160, a plasma reactor 162 is operably connected to the interior structure of a particulate trap 164 which, optionally, is connected to and surrounded by a catalytic converter 166 containing $NO_x$ reduction catalyst 168. When high voltage is supplied via high voltage power supply 178, plasma reactor 162 produces a plasma between wire anode electrode 170 and a grounded cathodic electrode which is a perforated metal tube 172 having an untreated exhaust inlet end 174 and a closed end 176. A woven silica-containing fiber filter 180 is wound around perforated metal tube 172 to form particulate trap 164. The perforated metal tube 172 serves two purposes: (1) acting as an electrode for plasma reactor 162 and (2) acting as a pathway for the particulates and $NO_x$ gases from the exhaust and/or from an intermediate gas flow including plasma-produced $NO_2$ gas. The particulates from the exhaust are collected on silica-containing fiber filter 180 after contributing volatile hydrocarbons to upstream plasma reactor 162. The gases in the system can pass conveniently through woven fiber filter 180 and exit via outlet 182 as a clean output gas flow. The trapped particulates on the filter are strategically located downstream of the plasma-produced $NO_2$ in order to provide a source of carbon soot that is oxidized by such $NO_2$. Furthermore, if additional $NO_x$ (and CO, HC and the like) conversion is necessary to meet emission standards, an optional $NO_x$ reduction catalyst 168 is conveniently placed to surround the wrapped filter and can readily promote the reduction of unconverted NO, $NO_2$ (and CO) to benign gases that can be removed through outlet 182.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for reducing nitrogen oxides ($NO_x$) and particulates in oxygen-rich exhausts from high-temperature combustion, the method comprising the steps of:
   converting substantially all NO in an engine exhaust comprising greater than about 5 ppmw of sulfur components, calculated as S, with a non-thermal plasma to an intermediate gas flow including $NO_2$;
   collecting particulates from said engine exhaust; and
   converting said particulates and substantially all of said intermediate gas flow including $NO_2$ to an output gas flow comprising $NO_2$ conversion products of $N_2$, $CO_2$ and $H_2O$ and substantially little carbon soot, NO and $NO_2$ ($NO_x$).

2. The method defined in claim 1 wherein volatile hydrocarbons contained in said particulates and said NO are simultaneously oxidized in said non-thermal plasma.

3. The method defined in claim 1 wherein said engine exhaust comprises exhaust from a diesel engine.

4. The method defined in claim 1 wherein said engine exhaust comprises greater than about 20 ppmw of sulfur components, calculated as S.

5. The method defined in claim 1 wherein said $NO_2$ is reacted with carbon soot contained in said particulates.

6. The method defined in claim 5 further comprising contacting said intermediate gas flow with a $NO_x$ reduction catalyst after said $NO_2$ reacted with said carbon soot.

7. The method defined in claim 1 wherein said engine exhaust comprises at least 4 g/bhp-hr of $NO_x$ and at least 0.1 g/bhp-hr of said particulates.

8. The method defined in claim 1 wherein said output gas flow comprises less than about 0.1 g/bhp-hr of said particulates and less than about 2.5 g/bhp-hr of said $NO_x$.

9. The method defined in claim 1 wherein said engine exhaust comprises at least 2 g/bhp-hr of $NO_x$ and at least 0.1 g/bhp-hr of said particulates.

10. The method defined in claim 1 wherein said output gas flow comprises less than about 0.05 g/bhp-hr of said particulates and less than about 0.5 g/bhp-hr of said $NO_x$.

11. The method defined in claim 1 wherein said particulates are collected by interception, impaction or diffusion.

12. The method defined in claim 1 wherein said particulates are electrostatically collected.

13. The method of claim 1 wherein said non-thermal plasma is produced in a reactor further comprising a particulate trap for collecting said particulates and for supplying volatile hydrocarbons obtained from said particulates to said NO.

14. The method of claim 1 wherein said particulates are collected in a particulate trap surrounding a perforated encasing of a non-thermal plasma reactor producing said non-thermal plasma.

15. The method of claim 1 wherein a particulate trap for collecting said particulates is positioned upstream of a method for reducing $NO_x$ to $N_2$.

16. A method for reducing nitrogen oxides ($NO_x$) and particulates in oxygen rich exhausts from high-temperature combustion, the method comprising the steps of:

converting substantially all NO in an engine oxygen-rich exhaust in the presence of volatile hydrocarbons from said particulates to an intermediate gas flow including $NO_2$ in a non-thermal plasma reactor;

collecting said particulates; and converting substantially all of said intermediate gas flow including $NO_2$ and said particulates to an output gas flow comprising $NO_2$-conversion products of $N_2$, $CO_2$ and $H_2O$ and substantially little NO and $NO_2$ ($NO_x$), said output gas flow comprising less than about 0.1 g/bhp-hr of said particulates and less than about 2.5 g/bhp-hr of said $NO_x$.

17. The method of claim 16 wherein said hydrocarbons comprise a component of diesel fuel or a component derived from diesel fuel.

18. The method of claim 16 wherein said non-thermal plasma reactor further comprises a particulate trap for collecting said particulates and for supplying volatile hydrocarbons obtained from said particulates to said NO.

19. The method of claim 16 wherein said particulates collected in a particulate trap surrounding a perforated encasing of said non-thermal plasma reactor.

20. The method of claim 16 wherein said particulate trap position upstream of a method for reducing $NO_x$ to $N_2$.

21. The method defined in claim 16 wherein said engine exhaust comprises greater than about 5 ppmw of sulfur components, calculated as S.

22. The method defined in claim 16 wherein said engine exhaust comprises at least 4 g/bhp-hr of $NO_x$ and at least 0.1 g/bhp-hr of said particulates.

23. The method defined in claim 16 wherein said engine exhaust comprises at least 2 g/bhp-hr of $NO_x$ and at least 0.1 g/bhp-hr of said particulates.

24. The method defined in claim 16 wherein said output gas flow comprises less than about 0.05 g/bhp-hr of said particulates and less than about 0.5 g/bhp-hr of said $NO_x$.

25. The method defined in claim 16 wherein said particulates are collected by interception, impaction or diffusion.

26. The method defined in claim 16 wherein said particulates are electrostatically collected.

27. The method of claim 16 wherein volatile hydrocarbons contained in said particulates and said NO are simultaneously oxidized in said non-thermal plasma.

28. The method of claim 27 further comprising contacting said intermediate gas flow with a $NO_x$ reduction catalyst after said $NO_2$ reacted with said carbon soot.

29. The method of claim 16 wherein said $NO_2$ is reacted with carbon soot contained in said particles.

* * * * *